(12) United States Patent
Root

(10) Patent No.: US 7,610,478 B1
(45) Date of Patent: Oct. 27, 2009

(54) METHOD AND APPARATUS FOR IMPROVING A COMPUTER BOOT SEQUENCE

(75) Inventor: Michael Root, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 709 days.

(21) Appl. No.: 10/968,298

(22) Filed: Oct. 19, 2004

(51) Int. Cl.
*G06F 9/24* (2006.01)
*G06F 9/445* (2006.01)
*G06F 15/177* (2006.01)

(52) U.S. Cl. ............................ 713/1; 713/2; 713/100; 717/174; 717/175; 717/177

(58) Field of Classification Search ............... 713/1, 713/2, 100; 717/174, 175, 177
See application file for complete search history.

(56) References Cited

U.S. PATENT DOCUMENTS

| | | | | |
|---|---|---|---|---|
| 5,142,680 A | * | 8/1992 | Ottman et al. | 717/176 |
| 5,828,888 A | * | 10/1998 | Kozaki et al. | 717/170 |
| 6,128,734 A | * | 10/2000 | Gross et al. | 713/100 |
| 6,292,890 B1 | * | 9/2001 | Crisan | 713/2 |
| 6,356,965 B1 | * | 3/2002 | Broyles et al. | 710/104 |
| 6,493,824 B1 | * | 12/2002 | Novoa et al. | 713/162 |
| 6,963,981 B1 | * | 11/2005 | Bailey et al. | 726/22 |
| 7,073,013 B2 | * | 7/2006 | Lasser | 711/102 |
| 2004/0133790 A1 | * | 7/2004 | Hensley | 713/191 |

OTHER PUBLICATIONS

Shelley L. Shostak, v21i046: uoodoo—maintain directory of symlinks to home directories, Part01/01, comp.sources.misc, (Jul. 27, 1991).*
Wei William Xue, IV.3 Disks, partitions and slices under Solaris: Disk addressing conventions,http://multiboot.solaris-x86.org/iv/3.html (Dec. 15, 2003).*

* cited by examiner

*Primary Examiner*—Thomas Lee
*Assistant Examiner*—Michael J Brown
(74) *Attorney, Agent, or Firm*—Moser IP Law Group

(57) ABSTRACT

A method and apparatus for improving the boot sequence of a computer clone. The kernel within an operating system is designed to always access special devices within the computer's memory using a mount path that is hard coded into the kernel for each of the special devices. When the computer is cloned, the special devices are copied to a second computer without the need for subsequent alteration of the filesystem.

16 Claims, 2 Drawing Sheets

METHOD AND APPARATUS FOR IMPROVING A COMPUTER BOOT SEQUENCE

BACKGROUND OF THE INVENTION

1. Field of the Invention

Embodiments of the present invention generally relate to the copying, replicating or cloning of the stored contents of a memory, and more particularly, to improving the boot sequence of a computer clone.

2. Description of the Related Art

In many modern computer networks, new computers are added to the network by replicating or cloning existing computers within the network. Since many of the computers within a network have similar hardware and contain identical files and software, the contents of computer memory can be copied from a first computer to a second computer where the second computer becomes a clone of the first computer. Ideally, the second computer should operate in the same manner as the first computer. However, in computers that use an operating system that boots from multiple devices such as the UNIX operating system, the boot sequence of the cloned machine must be manually modified to enable the operating system to identify and utilize devices connected to the second computer. Typically, the copy of the operating system located on the second computer is identical to the operating system on the first computer. Consequently, the device identification and location information within the second computer that is used by the operating system still identifies the devices within the first computer (i.e., the device directory of the original and copy are identical). As such, the operating system will not boot properly since pointers and links to the devices will point to devices in or coupled to the wrong computer. This situation is compounded when the devices (including device files) are located on storage such as disk groups that are remotely located from the computer. Consequently, the present solution to this problem is to copy the operating system to the second computer, then manually alter the files and devices used by the kernel to hard code the correct paths in the file system to the new location of the devices. Such a manual process is tedious and time consuming.

Therefore, a need exists in the art for an improved method and apparatus used in cloning a computer to improve the boot sequence of the computer clone.

SUMMARY OF THE INVENTION

Embodiments of the present invention generally are directed to a method and apparatus for improving the boot sequence of a computer clone. The kernel within an operating system is designed in accordance with the invention to always access special devices within the computer's memory using a mount path that is hard coded into the kernel for each of the special devices. When the computer is cloned, the special devices are copied to a second computer without the need for subsequent alteration. These special devices, when opened upon execution of boot sequence, provide the parameters that the kernel requires to access the devices as well as update a minor number for each of the devices within the operating system to enable the special devices to point to the "real" devices within a disk group or other storage attached to the computer clone. The real devices are grouped (e.g., under a single subdirectory) and booting a special device boots a corresponding real device within a group. When booting, the kernel selects one real device (first real device) from which to boot, then the special devices are used to boot other real devices from the same group as the first real device. In this manner, the kernel will properly boot and access the devices without any manual reprogramming of the operating system within the computer clone.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
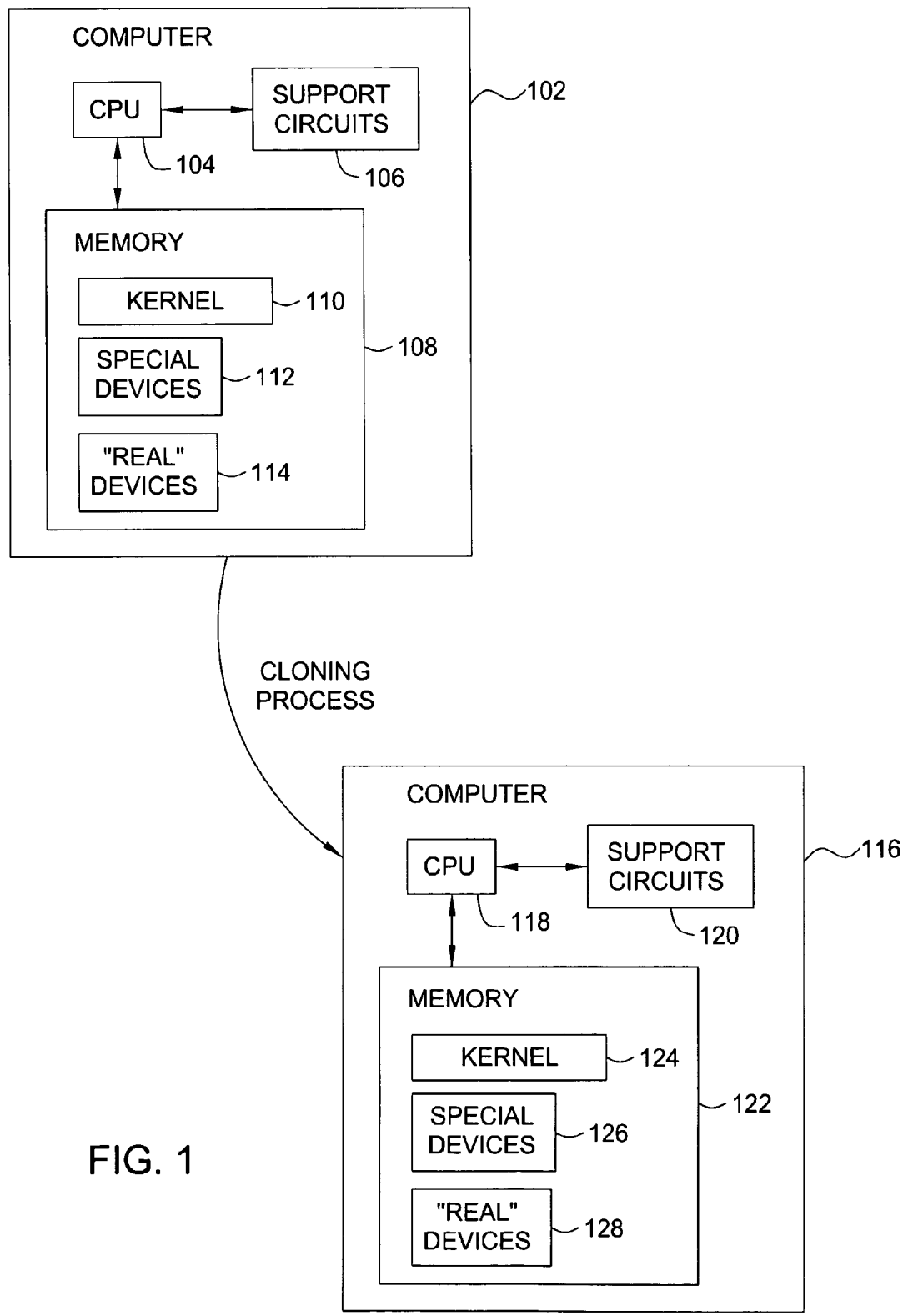
FIG. 1 illustrates a first computer and a second computer where the second computer is a clone of the first computer in accordance with the present invention.

FIG. 1 depicts a first computer 102 and a second computer 116 (a computer clone of the first computer 102). The first computer 102 comprises a central processing unit (CPU) 104, support circuits 106 and memory 108. The CPU 104 may comprise one or more conventionally available microprocessors. The support circuits 1-6 are well known circuits that comprise power supplies, clocks, input/output interface circuitry, peripheral device interfaces, and the like.

Memory 108 may comprise random access memory, read only memory, removable disk memory, flash memory, one or more disk drives and various combinations of these memory devices. The memory 108 is sometimes referred to as main memory and may in part be used as a cache memory or buffer memory. The memory 108 may also comprise remote storage, such as a disk group of a network storage system. The memory 108 stores applications, files and data. Additionally, the memory 108 also includes an operating system (e.g., an operating system that boots from a plurality of devices such as a UNIX operating system) which, in part, contains a kernel 110 as well as special devices 112 and "real" devices 114. The special devices 112 and "real" devices 114 are files used in support of the operating system to provide drivers for various physical, hardware devices and/or virtual devices. The use of the term "devices" to identify a file that is associated with a physical or virtual device is well known to those skilled in UNIX programming. The term UNIX, as used herein, is meant to include any operating system that uses a kernel to boot a file system including such operating systems as LINUX, AIX, NETBSD, and the like. The invention is intended to function with any operating system that boots from a plurality of devices. The UNIX operating system is intended to be one exemplary embodiment of an operating system that boots from multiple devices. Other operating systems such as WINDOWS from Microsoft Corporation may also boot using multiple devices. In many instances, the real devices may be associated with external storage that would be accessible through a software product such as VOLUME MANAGER manufactured by VERITAS Corporation of Mountain View, Calif. This product and/or other storage management software is used to virtualize a group of disk drives (i.e., form a disk group). In a virtual storage system, virtual devices are associated with the physical hardware. As such, the UNIX operating system treats the virtual devices as if they interact directly with the hardware even though, in reality, another layer of devices exists between the operating system and the hardware. As such, the term "real devices", as used herein, is meant to include virtual devices.

The second computer 116 is physically similar to the first computer 102 in that it contains a CPU 118, support circuits 120 and memory 122 that are similar to those components of computer 102. When a cloning process occurs, as is well known to those skilled in the art, the contents of the memory 108 are copied to the memory 122 of the second computer 116.

After the cloning process, the kernel 124, when used during the boot sequence, must access the "real" devices to complete the configuration process of the operating system. The kernel 124 interacts between the system hardware and the physical devices using the real devices as drivers for the hardware. When installed, the kernel 124 takes into account all hardware components and their features and builds a file designed to interact optimally with the particular hardware devices. For the kernel to understand where the devices are located and to be able to configure itself to optimally use those devices, a device directory must point to or identify the "real" devices to be used. The invention ensures the computer clone will properly interact with the devices by using a specially designed kernel 110.

In accordance with the present invention, within the first computer 102, the special devices 112 are linked to the kernel 110 via the device directory. These special devices are hard coded within the device directory as /dev/vx/device, where the device may be usrvol, swap, var, root or some other boot device. Corresponding to the special devices 126 are "real" devices that contain the actual boot information needed by the kernel to enable the operating system to interact with the hardware. These real devices 128 are grouped together to indicate that the computer clone 116 should use all the devices from the same group. For instance, the real devices 128 may be grouped in the same directory to indicate that these devices should be used together when booting. Depending upon the type of boot device, the real devices may be grouped in other manners besides using the same directory. For example, real devices could be identified by a tag and the tags grouped in a configuration file. Alternatively, in object based storage, the devices could be grouped by physical location. No matter what grouping format is used, the real devices used in the boot sequence are, generally speaking, associated with one another in some way to facilitate the boot process in accordance with the invention.

The special devices 112 are copied to the clone computer 116 and always provide a correct mount path for the kernel 124 even after cloning. Consequently, during the boot sequence, the kernel will open the special devices to read and write the boot devices. These special devices 126, when opened by the clone 124 of the kernel 110 during the boot process of the computer clone 116, will cause an update to the minor number of the device parameters and enable the kernel 124 to access the real devices. For example, the special device directory for the /swap device can be /dev/vx/swap and special device for /could be /dev/vx/rootvol. In this embodiment, the real device is grouped in a subdirectory /dev/vx/bootdg such that the subdirectory contained real devices /dev/vxtbootdg/swap and /dev/vx/bootdg/rootvol. When one of the real devices in the group in the subdirectory is being used to boot the computer 116, then all following accesses to the special devices provide access to the real devices. If /dev/vx/bootdg/rootvol is used in the boot sequence, any access to "swap" will be done through the special device to the correct swap device because the special device /dev/vx/swap knows to select /dev/vx/bootdg/swap as it is in the same group that is being used to boot the computer clone 116.

Figure 2:
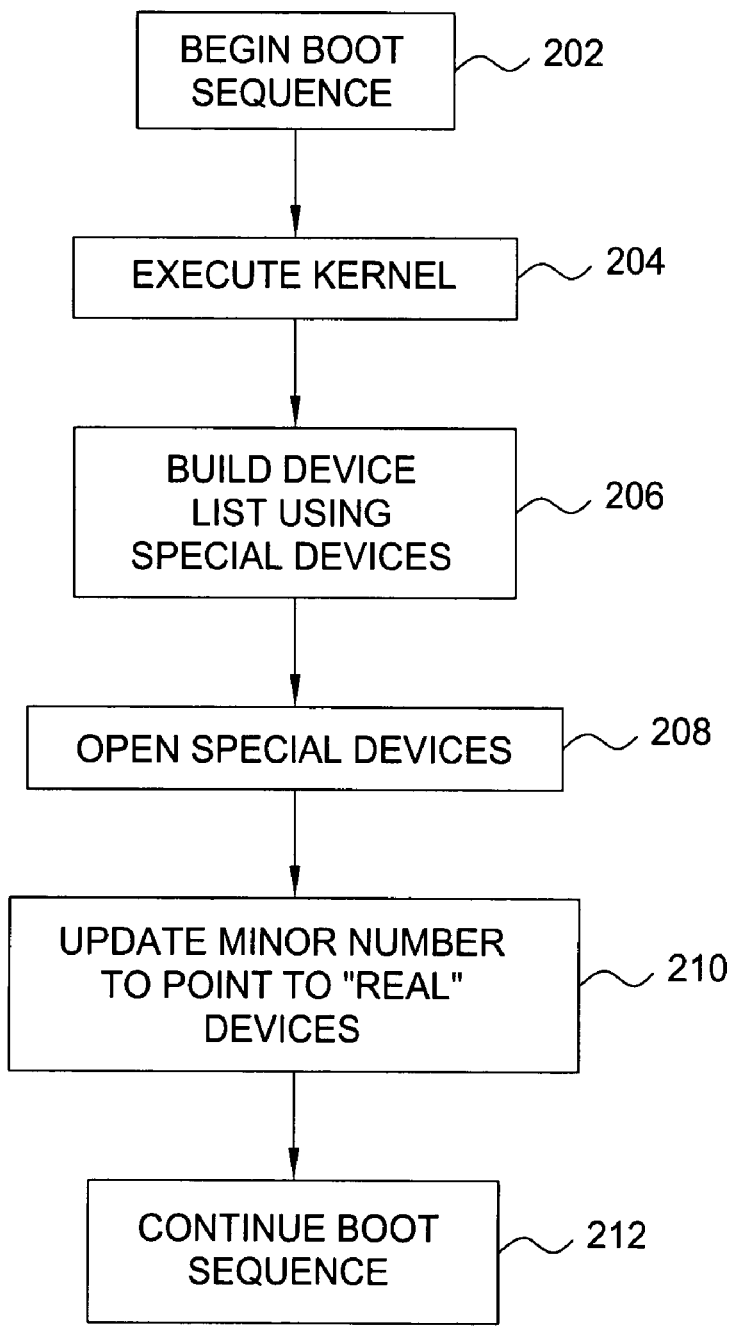
FIG. 2 is a method depicting a boot sequence for a computer cloned in accordance with the present invention.

FIG. 2 depicts a flow diagram of a portion of the boot sequence that uses the special devices of the present invention. The method 200 begins with the boot sequence starting up at step 202. In a conventional manner, during the boot sequence, the kernel is executed at step 204. While the kernel is executing, at step 206, it builds a device list using the special devices that are grouped and linked to the kernel via the device directory. The device directory represents a mount path to the special devices that are grouped into a single subdirectory. At step 208, the kernel opens the special devices and as each one is opened, at step 210, each special device file will set the kernel parameters for a representative device and the minor number is updated so that the "real" devices are all selected from the same group of real devices. Once the real devices are accessed and added to the kernel's list of accessible devices, at step 212, the boot sequence continues in a normal and conventional manner.

While the foregoing is directed to embodiments of the present invention, other and further embodiments of the invention may be devised without departing from the basic scope thereof, and the scope thereof is determined by the claims that follow.

The invention claimed is:

1. Apparatus for improving a boot sequence comprising:
a kernel;
a plurality of real devices that are grouped together;
a special device that is accessible by the kernel for a path to at least one real device in said plurality of grouped real devices;
wherein subsequent accesses to the special device provide access to each of the plurality of grouped real devices.

2. The apparatus of claim 1 where said special device is at least one of /swap, /var, /usrvol and /root.

3. The apparatus of claim 1 wherein the plurality of real devices are grouped within a subdirectory.

4. The apparatus of claim 1 wherein the boot sequence is performed on a computer clone.

5. The apparatus of claim 1 wherein the kernel is a kernel of a UNIX operating system.

6. A method of cloning a computer comprising:
providing, with a first computer, a kernel, a special device and a group of real devices, where the special device is accessible to the kernel to provide device parameters and establishes a minor number for at least one real device in said group of real devices;
copying the kernel and the special device from the first computer to a second computer; and booting the second computer to have the copy of the kernel access at least one real device in the group of real devices using the copy of the special device;

wherein subsequent accesses to the special device provide access to each of the plurality of grouped real devices.

7. The method of claim 6 where said special device is at least one of /swap, /var, /usrvol and /root.

8. The method of claim 6 wherein the plurality of real devices are grouped within a subdirectory.

9. The method of claim 6 wherein the booting step further comprises accessing the real devices without altering a filesystem of the second computer.

10. The method of claim 6 wherein the kernel is a kernel of a UNIX operating system.

11. A method of booting a computer comprising:
executing a kernel from a first real device;
accessing, during a boot sequence of the kernel, at least one special device that is associated with a second real device, where the first real device and the second real device are grouped together;
wherein subsequent accesses to the special device provide access to each of the real devices grouped together.

12. The method of claim 11 where said special device is at least one of /swap, /var, /usrvol and /root.

13. The method of claim 11 wherein the plurality of real devices are grouped within a subdirectory.

14. The method of claim 11 wherein the computer is a computer clone.

15. The method of claim 11 wherein the accessing step further comprises accessing the second real device without altering a filesystem of the computer.

16. The method of claim 11 wherein the kernel is a kernel of a UNIX operating system.

\* \* \* \* \*